(12) United States Patent
Shiba et al.

(10) Patent No.: US 11,598,877 B2
(45) Date of Patent: Mar. 7, 2023

(54) OBJECT RECOGNITION DEVICE AND VEHICLE CONTROL SYSTEM

(71) Applicant: Toyota Jidosha Kabushiki Kaisha, Toyota (JP)

(72) Inventors: Shintaro Shiba, Susono (JP); Taichi Kawanai, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 541 days.

(21) Appl. No.: 16/782,357

(22) Filed: Feb. 5, 2020

(65) Prior Publication Data
US 2020/0301019 A1  Sep. 24, 2020

(30) Foreign Application Priority Data

Mar. 22, 2019 (JP) .............................. JP2019-054724

(51) Int. Cl.
G01S 17/931 (2020.01)
G06T 7/70 (2017.01)
G01S 17/89 (2020.01)
G05D 1/02 (2020.01)
G06V 20/58 (2022.01)

(52) U.S. Cl.
CPC ............ G01S 17/931 (2020.01); G01S 17/89 (2013.01); G05D 1/0214 (2013.01); G06T 7/70 (2017.01); G06V 20/58 (2022.01); G06T 2207/10028 (2013.01); G06T 2207/30261 (2013.01)

(58) Field of Classification Search
CPC ..... G01S 17/931; G01S 17/89; G05D 1/0214; G06T 7/70; G06T 2207/10028; G06T 2207/30261; G06V 20/58
See application file for complete search history.

(56) References Cited

U.S. PATENT DOCUMENTS

| 2017/0101056 A1* | 4/2017 | Park ......................... G08G 1/04 |
| 2017/0267244 A1* | 9/2017 | Kim .................... B60W 10/182 |
| 2018/0292834 A1 | 10/2018 | Kindo |
| 2019/0243371 A1* | 8/2019 | Nister .................. G05D 1/0242 |
| 2019/0299984 A1* | 10/2019 | Shalev-Shwartz .... B60W 50/12 |
| 2020/0182626 A1* | 6/2020 | He .......................... G06F 16/29 |
| 2020/0284883 A1* | 9/2020 | Ferreira ................ G01S 7/4817 |

FOREIGN PATENT DOCUMENTS

JP  2018-176879 A  11/2018

* cited by examiner

Primary Examiner — Ig T An
(74) Attorney, Agent, or Firm — Dinsmore & Shohl LLP

(57) ABSTRACT

A vehicle includes a LIDAR. An object recognition device: sets a space having a height from an absolute position of a road surface as a noise space; classifies a LIDAR point cloud into a first point cloud included in the noise space and a second point cloud outside the noise space; extracts a fallen object candidate being a candidate for a fallen object on the road surface based on the first point cloud; extracts a tracking target candidate being a candidate for a tracking target based on the second point cloud; determines whether horizontal positions of the fallen object candidate and the tracking target candidate are consistent with each other; integrates the fallen object candidate and the tracking target candidate whose horizontal positions are consistent with each other, to be the tracking target; and recognizes the fallen object candidate not integrated into the tracking target as the fallen object.

9 Claims, 18 Drawing Sheets

OBJECT RECOGNITION DEVICE AND VEHICLE CONTROL SYSTEM

CROSS-REFERENCE TO RELATED APPLICATION

This application claims priority to Japanese Patent Application No. 2019-054724 tiled on Mar. 22, 2019, the entire contents of which are herein incorporated by reference.

BACKGROUND

Technical Field

The present disclosure relates to an object recognition device that recognizes an object around a vehicle, and to a vehicle control system that controls the vehicle.

Background Art

Patent Literature 1 discloses a path setting device that sets a path of a vehicle during automated driving. The path setting device detects an obstacle around the vehicle. In addition, the path setting device generates plural kinds of path candidates by assuming that the detected obstacle is either a stationary obstacle or a moving obstacle. Then, the path setting device determines a path out of the plural kinds of path candidates, based on reliability of each path candidate.

LIST OF RELATED ART

Patent Literature 1; Japanese Laid-Open Patent Application Publication No. JP-2018-176879

SUMMARY

A sensor such as a LIDAR (Laser Imaging Detection and Ranging) is used for recognition (perception) of an object around a vehicle. However, as to a space near a road surface, false recognition may occur due to influence of noise. Therefore, it may be conceivable to exclude the space near the road surface from a recognition target space. In that case, however, it is not possible to recognize a fallen object on the road surface.

An object of the present disclosure is to provide a technique that can increase accuracy of recognition of a fallen object on a road surface, with regard to object recognition processing that recognizes an object around a vehicle.

A first aspect is directed to an object recognition device that recognizes an object around a vehicle.

The vehicle includes a LIDAR (Laser Imaging Detection and Ranging).

A LIDAR point cloud is a set of detected points detected by the LIDAR.

The object recognition device includes: a memory device in which LIDAR measurement information indicating a detected position of each of the detected points, position attitude information indicating an absolute position and an attitude of the vehicle, and terrain map information indicating an absolute position of a road surface are stored; and a processor configured to execute object recognition processing that recognizes the object around the vehicle.

The object includes a fallen object on the road surface and a tracking target other than the fallen object.

In the object recognition processing, the processor: sets a space having a first height from the absolute position of the road surface as a noise space, based on the terrain map information; classifies the LIDAR point cloud into a first point cloud included in the noise space and a second point cloud not included in the noise space, based on the LIDAR measurement information and the position attitude information; executes first extraction processing that extracts a fallen object candidate being a candidate for the fallen object, based on the first point cloud; executes second extraction processing that extracts a tracking target candidate being a candidate for the tracking target, based on the second point cloud; determines whether or not horizontal positions of the fallen object candidate and the tracking target candidate are consistent with each other; integrates the fallen object candidate and the tracking target candidate whose horizontal positions are consistent with each other, to be the tracking target; and recognizes the fallen object candidate not integrated into the tracking target as the fallen object.

A second aspect further has the following feature in addition to the first aspect.

The first height is predetermined based on an error in a pitch angle of the vehicle.

A third aspect further has the following feature in addition to the first or second aspect.

A road surface point cloud is the LIDAR point cloud representing the road surface.

The first point cloud includes the road surface point cloud and a fallen object point cloud other than the road surface point cloud.

In the first extraction processing, the processor: executes separation processing that separates the first point cloud into the road surface point cloud and the fallen object point cloud, based on the LIDAR measurement information or the terrain map information; and extracts the fallen object candidate based on the fallen object point cloud.

A fourth aspect further has the following feature in addition to the third aspect.

Regarding the first point cloud belonging to a same layer, there is a difference between the detected position of the fallen object point cloud and the detected position of the road surface point cloud.

A feature quantity is a parameter characterizing the difference.

In the separation processing, the processor: calculates the feature quantity of each of the detected points of the first point cloud, based on the LIDAR measurement information on the first point cloud; and separates the first point cloud into the road surface point cloud and the fallen object point cloud, based on the feature quantity.

A fifth aspect further has the following feature in addition to the fourth aspect.

The feature quantity includes a distance from the LIDAR to each of the detected points.

A sixth aspect further has the following feature m addition to the fourth or fifth aspect.

The feature quantity includes a difference in the detected position between adjacent detected points.

A seventh aspect further has the following feature in addition to any one of the fourth to sixth aspects.

A fallen object likelihood is likelihood that the fallen object candidate is the fallen object.

The processor further executes likelihood calculation processing that calculates the fallen object likelihood after extracting the fallen object candidate.

An eighth aspect further has the following feature in addition to the seventh aspect.

A separation criterion for separating the road surface point cloud and the fallen object point cloud is predetermined.

In the likelihood calculation processing, the processor calculates the fallen object likelihood based on the separation criterion and the feature quantity regarding the fallen object point cloud corresponding to the fallen object candidate.

The fallen object likelihood becomes higher as the feature quantity regarding the fallen object point cloud corresponding to the fallen object candidate is further away front the separation criterion.

A ninth aspect further has the following feature in addition to the seventh or eighth aspect.

A continuity represents a degree to which a position of the fallen object candidate is continuous over time.

In the likelihood calculation processing, the processor: calculates the continuity based on an extraction history of the fallen object candidate; increases the fallen object likelihood, when the continuity is equal to or higher than a continuity threshold; and decreases the fallen object likelihood, when the continuity is lower than the continuity threshold.

A tenth aspect is directed to a vehicle control system.

The vehicle control system includes: the object recognition device described above; and a vehicle travel control device configured to execute vehicle travel control that controls travel of the vehicle based on a result of the object recognition processing.

For example, the vehicle travel control device generates a travel plan against the fallen object according to the fallen object likelihood, and executes the vehicle travel control in accordance with the travel plan.

An eleventh aspect further has the following feature in addition to the tenth aspect.

A second threshold is higher than a first threshold.

When the fallen object likelihood is equal to or higher than the first threshold and lower than the second threshold, the travel plan includes turning off acceleration.

When the fallen object likelihood is equal to or higher than the second threshold, the travel plan includes performing at least one of deceleration and steering in order to avoid the fallen object.

According to the present disclosure, the noise space near the road surface is set based on the terrain map information indicating the absolute position of the road surface. The LIDAR point cloud indicated by the LIDAR measurement information is classified into the first point cloud included in the noise space and the other second point cloud. The fallen object candidate included in the noise space is extracted from the first point cloud. On the other hand, the tracking target candidate not included in the noise space is extracted from the second point cloud.

Accuracy of extraction of the tracking target candidate not included in the noise space is higher than accuracy of extraction of the fallen object candidate included in the noise space. When the horizontal positions of the fallen object candidate and the tracking target candidate are consistent with each other, it is possible to judge that not a fallen object but a tracking target exists at that position. In that case, the fallen object candidate and the tracking target candidate are integrated as the tracking target. In other words, the fallen object candidate overlapping with the tracking target candidate is recognized not as the fallen object but as the tracking target. As a result, false recognition of the fallen object is suppressed. That is, it is possible to increase accuracy of recognition of the fallen object.

DETAILED DESCRIPTION

Embodiments of the present disclosure will be described below with reference to the attached drawings.

1. First Embodiment 1-1. LIDAR Point Cloud

Figure 1:
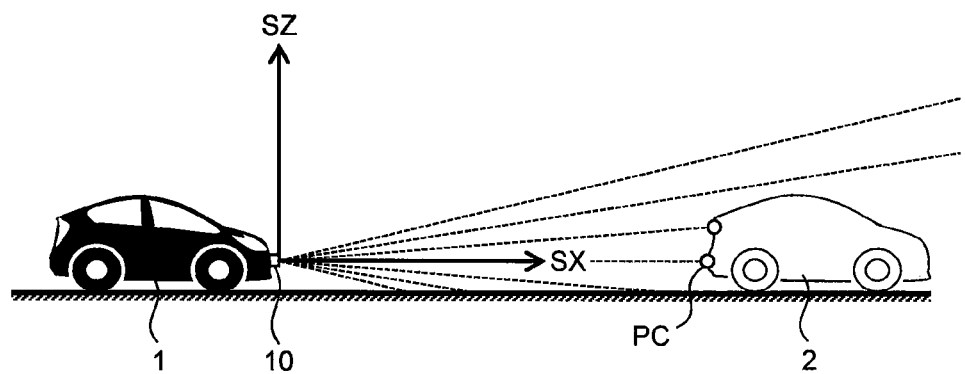
FIG. 1 is a conceptual diagram tor explaining a LIDAR installed on a vehicle according to a first embodiment of the present disclosure.

FIG. 1 is a conceptual diagram tor explaining a LIDAR (Laser Imaging Detection and Ranging) 10 installed on a vehicle 1 according to the present embodiment. The LIDAR 10 is used for recognizing an object around the vehicle 1.

More specifically, the LIDAR 10 outputs (scans) laser pulses to multiple directions in sequence. When a laser pulse is reflected at a reflection point on an object, a reflected light of the laser pulse returns to the LIDAR 10. The LIDAR 10 receives the reflected light of the laser pulse. Based on a reception state of the reflected light, the LIDAR 10 can calculate a position (i.e., a distance and a direction) of the reflection point in a sensor coordinate system fixed to the LIDAR 10. In the example shown in FIG. 1, an SX-axis of the sensor coordinate system, which is a central axis of the scanning, is parallel to a horizontal direction. An SZ-axis of the sensor coordinate system is orthogonal to the SX-axis and parallel to a vertical scan plane. It should be noted that the sensor coordinate system is not limited to that example.

In the following description, the point (i.e., the reflection point) detected by the LIDAR 10 is referred to as a "detected point." The position of the detected point is hereinafter referred to as a "detected position." A set of detected points is hereinafter referred to as a "LIDAR point cloud PC." It is possible to recognize an object around the vehicle 1 and a relative position of the object based on the LIDAR point cloud PC. For example, as shown in FIG. 1, it is possible to recognize a preceding vehicle 2 ahead of the vehicle 1 and its relative position.

Figure 2:
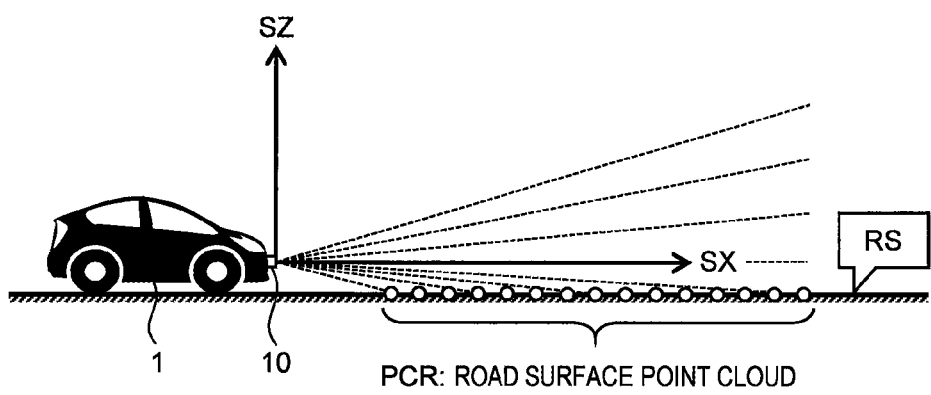
FIG. 2 is a conceptual diagram for explaining a road surface point cloud in the first embodiment of the present disclosure.

FIG. 2 is a conceptual diagram for explaining a road surface point cloud PCR. Laser pulses output from the LIDAR 10 are reflected also by minute irregularities of a road surface RS. The road surface point cloud PCR is a point cloud representing the road surface RS among the LIDAR point cloud PC.

1-2. Object Recognition Device

Figure 3:
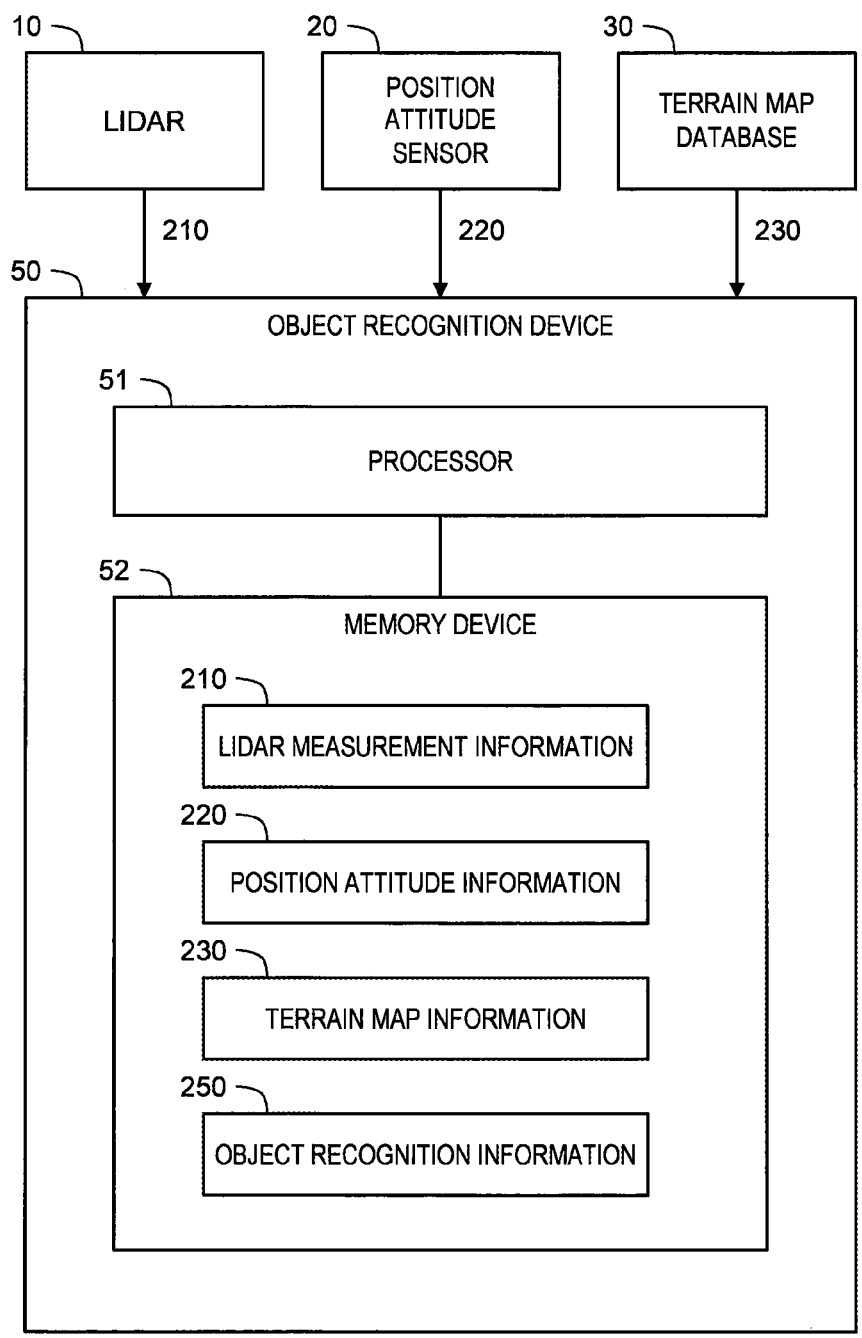
FIG. 3 is a block diagram for explaining air object recognition device according to the first embodiment of the present disclosure.

FIG. 3 is a block diagram for explaining an object recognition device 50 according to the present embodiment. The object recognition device 50 is connected to the LIDAR 10, a position attitude sensor 20, and a terrain map database 30.

As described above, the LIDAR 10 is installed on the vehicle 1 and acquires information about the LIDAR point cloud PC.

The position attitude sensor 20 is installed on the vehicle 1 and detects an absolute position and an attitude of the vehicle 1. The absolute position of the vehicle 1 is defined in an absolute coordinate system (i.e., latitude, longitude, and altitude). The attitude of the vehicle 1 includes an orientation, a pitch angle, and a roll angle. For example, the position attitude sensor 20 includes a GPS (Global Positioning System) sensor that detects the absolute position and the orientation of the vehicle 1. In addition, the position attitude sensor 20 includes an attitude sensor that detects the pitch angle and the roll angle of the vehicle 1.

The terrain map database 30 is a database of terrain map information 230. The terrain map information 230 is map information regarding terrain. More specifically, the terrain map information 230 indicates an absolute position of the road surface RS. For example, the terrain map information 230 indicates a horizontal position (i.e., latitude and longitude) and a height (i.e., altitude) of each point of the road surface RS, wherein the horizontal position and the height are associated with each other. The terrain map database 30 may be stored in a predetermined memory device installed on the vehicle 1, or may be stored in a management server outside the vehicle 1.

The object recognition device 50 recognizes an object around the vehicle 1. The object recognition device 50 includes a processor 51 and a memory device 52. A variety of information is stored in the memory device 52. The processor 51 executes a variety of processing by executing a computer program. The computer program is stored in the memory device 52 or recorded on a computer-readable recording medium.

More specifically, the processor 51 executes "information acquisition processing" that acquires LIDAR measurement information 210, position attitude information 220, and terrain map information 230. The processor 51 stores the acquired information in the memory device 52.

The LIDAR measurement information 210 is information on the LIDAR point cloud PC. In particular, the LIDAR measurement information 210 indicates the detected position of each of the detected points of the LIDAR point cloud PC in the sensor coordinate system. The LIDAR measurement information 210 may further indicate a reflection intensity at each of the detected points. The processor 51 acquires the LIDAR measurement information 210 from the LIDAR 10.

The position attitude information 220 indicates the absolute position and the attitude of the vehicle 1. The processor 51 acquires the position attitude information 220 from the position attitude sensor 20. The processor 51 may further execute commonly-known localization processing in order to increase accuracy of the position attitude information 220. In that case, the processor 51 acquires information on characteristic objects (e.g., white lines, signs, poles) around the vehicle 1 to execute the localization processing.

The terrain map information 230 indicates the absolute position of the road surface RS, as described above. The processor 51 refers to the position attitude information 220 to acquire the terrain map information 230 concerning the road surface RS around the vehicle 1. When the terrain map database 30 is stored in the management server outside the vehicle 1, the processor 51 communicates with the management server to acquire necessary terrain map information 230.

Furthermore, the processor 51 executes "object recognition processing" that recognizes an object around the vehicle 1. As will be described later, the processor 51 executes the object recognition processing based on the LIDAR measurement information 210, the position attitude information 220, and the terrain map information 230. Object recognition information 250 is information indicating a result of the object recognition processing. The processor 51 stores the object recognition information 250 obtained by the object recognition processing in the memory device 52.

It should be noted that the object recognition device 50 is typically achieved by a microcomputer installed on the vehicle. However, the object recognition device 50 is not necessarily installed on the vehicle 1. As long as the object recognition device 50 can acquire the information required for the object recognition processing, its installation position is not limited in particular.

Hereinafter, the object recognition processing according to the present embodiment will be described in more detail.

1-3. Object Recognition Processing

Figure 4:
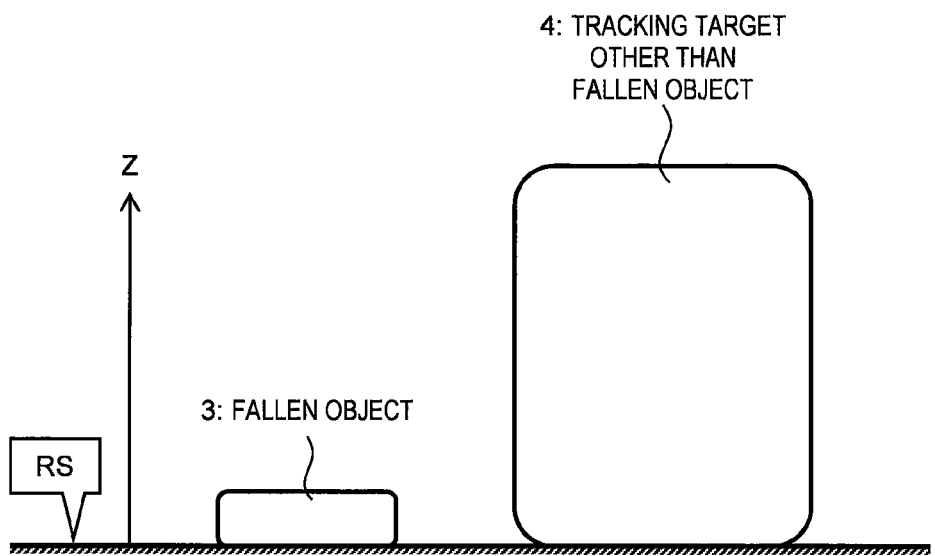
FIG. 4 is a conceptual diagram indicating objects that are recognized by object recognition processing according to the first embodiment of the present disclosure.

FIG. 4 is a conceptual diagram indicating objects that are recognized by the object recognition processing according to the present embodiment, in the object recognition processing, an object being a target of tracking is recognized. Such the tracking target is exemplified by another vehicle, a pedestrian, a sign board, a pylon, a roadside structure, a fallen object, and so forth. In the present embodiment, a fallen object 3 on the road surface RS and a tracking target 4 other than the fallen object 3 are considered separately. In general, the fallen object 3 exists only in the vicinity of the road surface RS, and a height of the fallen object 3 is significantly lower than that of the tracking target 4. The object recognition processing according to the present embodiment distinguishes between the fallen object 3 and the tracking target 4.

In the object recognition processing, the LIDAR measurement information 210 acquired by the LIDAR 10 is used. More specifically, the object is recognized by applying a clustering process to the LIDAR point cloud PC indicated by the LIDAR measurement information 210.

However, as to a space (layer) near the road surface RS, false recognition may occur due to influence of noise. One of causes for the noise is the road surface point cloud PCR included in the LIDAR point cloud PC. When the space near the road surface RS is excluded from a recognition target space, it is not possible to recognize the fallen object 3 on the road surface RS.

In view of the above, the present embodiment provides a technique that can increase accuracy of recognition of the fallen object 3 in the object recognition processing.

Figure 5:
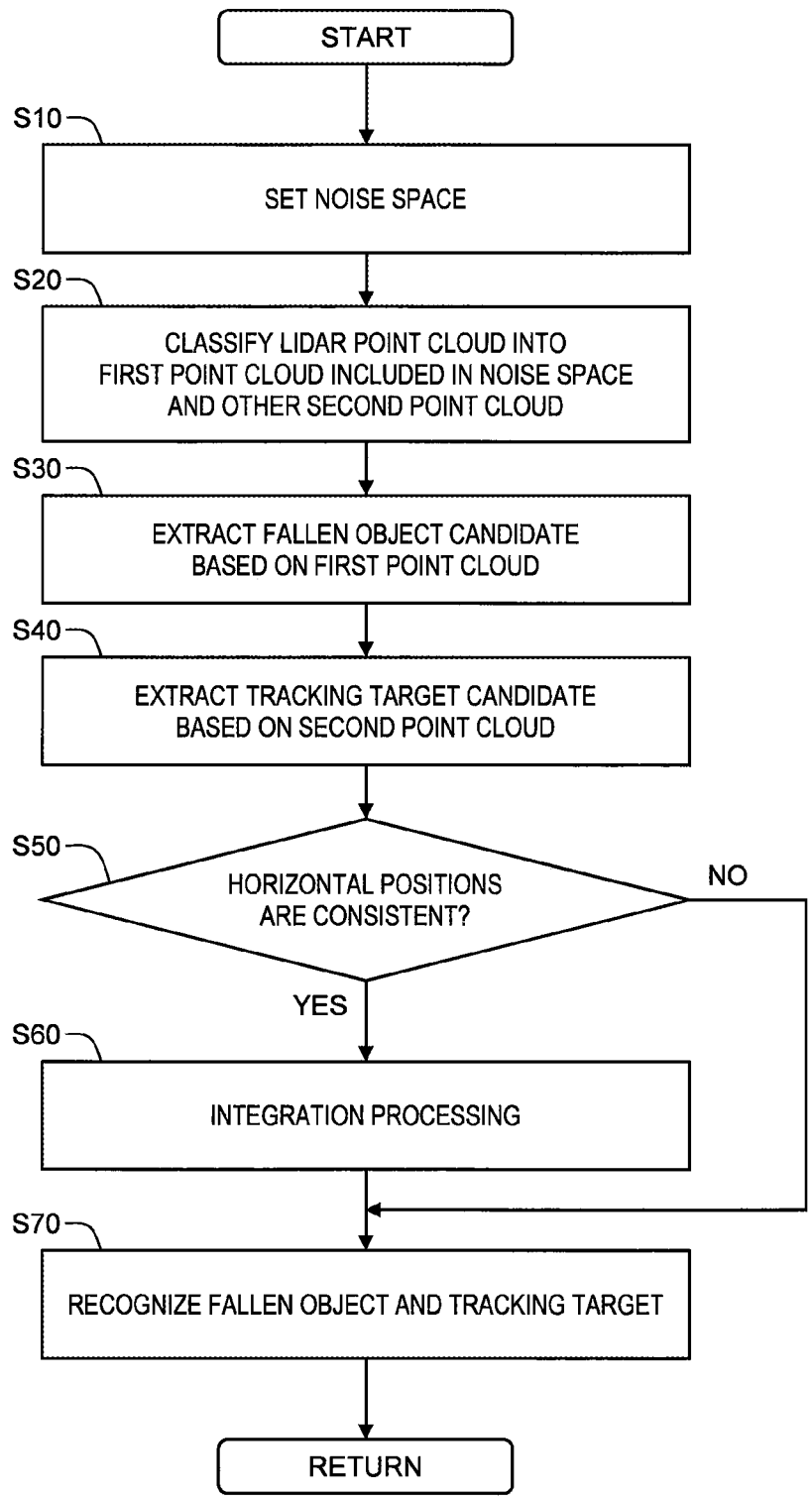
FIG. 5 is a flow chart showing the object recognition processing according to the first embodiment of the present disclosure.

FIG. 5 is a flow chart showing the object recognition processing according to the present embodiment. Hereinafter, each step of the object recognition processing according to the present embodiment will be described.

1-3-1. Step S10

Figure 6:
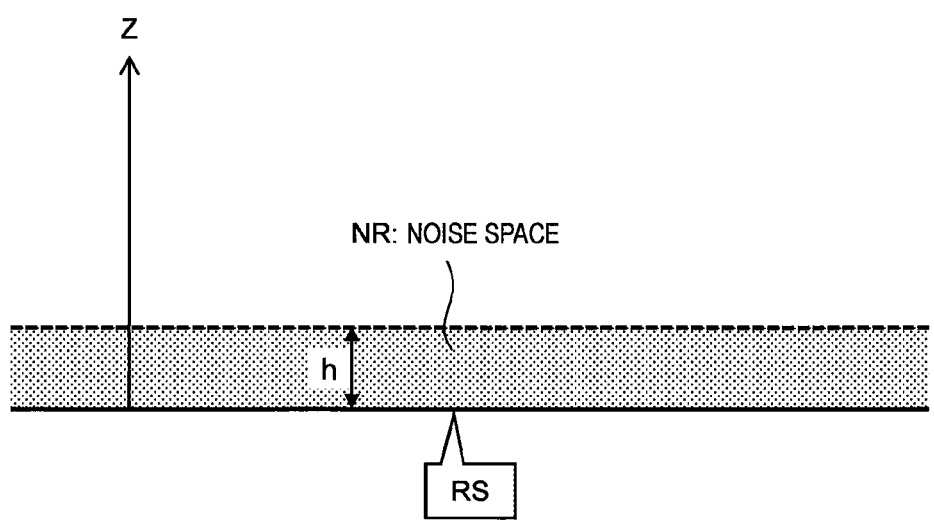
FIG. 6 is a conceptual diagram for explaining Step S10 of the object recognition processing according to the first embodiment of the present disclosure.

FIG. 6 is a conceptual diagram for explaining Step S10. A Z-direction represents a vertical direction. In Step S10, the processor 51 sets a "noise space NR" where influence of the noise is considered to be large. As shown in FIG. 6, the noise space NR is a space having a height h (first height) from the absolute position of the road surface RS. The absolute position of the road surface RS is obtained from the terrain map information 230 described above. The height h is predetermined. An example of a policy tor determining the height h is as follows.

An absolute position of each detected point of the LIDAR point cloud PC can be calculated based on the LIDAR measurement information 210 and the position attitude information 220. However, the position attitude information 220 may include an error. In particular, an error in the pitch angle of the vehicle 1 causes a calculation error of the altitude of the road surface point cloud PCR. Therefore, a parameter reflecting such the calculation error of the altitude of the road surface point cloud PCR is used as the height h of the noise space NR. More specifically, a predetermined expected value is set as the error in the pitch angle of the vehicle 1. Then, the height h is determined based on the error in the pitch angle. For example, a product of the error in the pitch angle and a maximum measurement distance of the LIDAR 10 is used as the height h.

Information indicating the height h is stored in the memory device 52 in advance. Based on the terrain map information 230 and the information on the height h, the processor 51 sets a space having the height h from the absolute position of the road surface RS as the noise space NR. In many cases, the height of the fallen object 3 is equivalent to or lower than the height h of the noise apace NR.

1-3-2. Step S20

Figure 7:
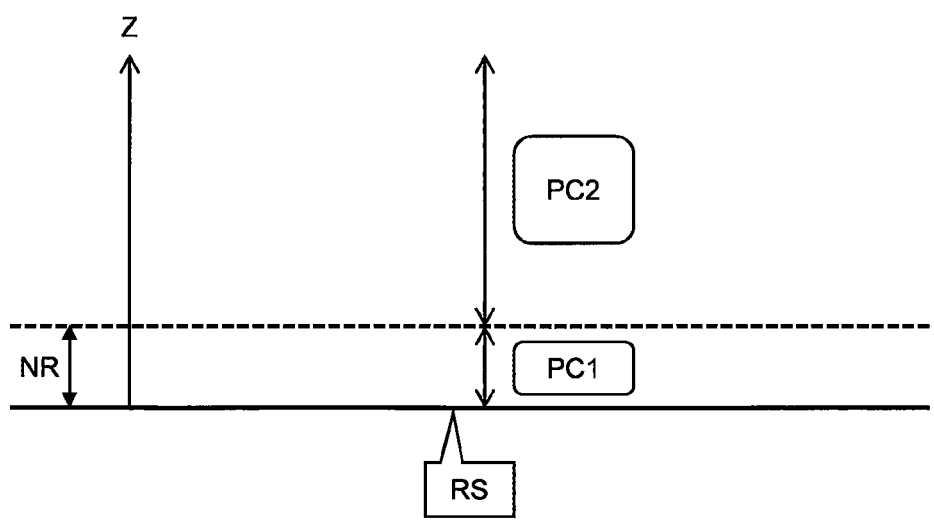
FIG. 7 is a conceptual diagram for explaining Step S20 of the object recognition processing according to the first embodiment of the present disclosure.

FIG. 7 is a conceptual diagram for explaining Step S20. In Step S20, the processor 51 classifies the LIDAR point cloud PC into a first point cloud PC1 included in the noise space NR and a second point cloud PC2 not included in the noise space NR.

As described above, the LIDAR measurement information 210 indicates the detected position of each detected point of the LIDAR point cloud PC in the sensor coordinate system. The position attitude information 220 indicates the absolute position and the attitude of the vehicle 1. The processor 51 calculates the absolute position of each detected point of the LIDAR point cloud PC, based on the LIDAR measurement information 210 and the position attitude information 220. Then, the processor 51 refers to the noise space NR to classify the LIDAR point cloud PC into the first point cloud PC1 and the second point cloud PC2.

1-3-3. Step S30 (First Extraction Processing)

Figure 8:
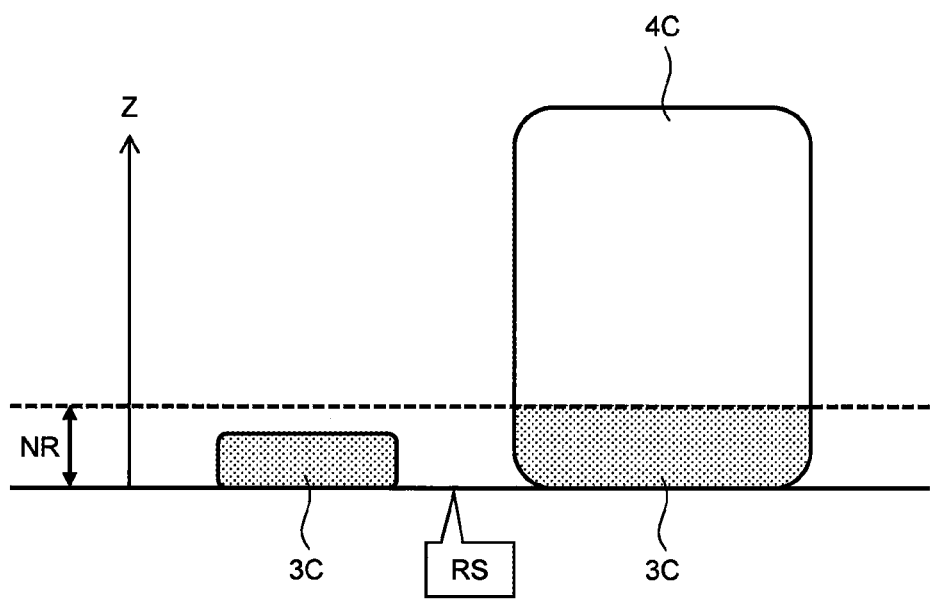
FIG. 8 is a conceptual diagram for explaining Steps S30 and S40 of the object recognition processing according to the first embodiment of the present disclosure.

FIG. 8 is a conceptual diagram for explaining Step S30. In Step S30 (first extraction processing), the processor 51 extracts a candidate tor the fallen object 3 based on the first point cloud PC1 included in the noise space NR. The candidate for the fallen object 3 is hereinafter referred to as a "fallen object candidate 3C."

It should be noted that the first point cloud PC1 includes the road surface point cloud PCR. In order to extract the fallen object candidate 3C, it is desirable to separate the road surface point cloud PCR and others. The first point cloud PC1 other than the road surface point cloud PCR is hereinafter referred to as a "fallen object point cloud PCF."

The processor 51 executes separation processing that separates the first point cloud PC1 into the road surface point cloud PCR and the fallen object point cloud PCF. For example, the processor 51 uses the terrain map information 230 to execute the separation processing. More specifically, the absolute position of the road surface RS indicated by the terrain map information 230 is regarded as an absolute position of the road surface point cloud PCR. The absolute position of each detected point of the LIDAR point cloud PC is calculated based on the LIDAR measurement information 210 and the position attitude information 220. Since the absolute position of the LIDAR point cloud PC and the absolute position of the road surface point cloud PCR are obtained, it is possible to eliminate the road surface point cloud PCR from the LIDAR point cloud PC.

As another example, the processor 51 can execute the separation processing based on the LIDAR measurement information 210, without using the terrain map information 230. Such the separation processing based on the LIDAR measurement information 210 will be described in details in a second embodiment which will be described later.

After the separation processing, the processor 51 extracts the fallen object candidate 3C based on the fallen object point cloud PCF. More specifically, the processor 51 extracts the fallen object candidate 3C by applying a well-known clustering process to the fallen object point cloud PCF.

It should be noted that, as shows in FIG. 8, a lower part of the tracking target 4 included in the noise space NR also is temporarily extracted as the fallen object candidate 3C.

1-3-4. Step S40 (Second Extraction Processing)

In Step S40 (second extraction processing), the processor 51 extracts a candidate for the tracking target 4 based on the second point cloud PC2. The candidate for the tracking target 4 is hereinafter referred to as a "tracking target candidate 4C." The processor 51 extracts the tracking target candidate 4C by applying the well-known clustering process to the second point cloud PC2.

1-3-5. Step S50

As shown in FIG. 8, at a horizontal position where the tracking target 4 actually exists, the fallen object candidate 3C and the tracking target candidate 4C overlap with each other in the Z-direction. In other words, horizontal positions of the fallen object candidate 3C and the tracking target candidate 4C are consistent with each other. When the horizontal positions of the fallen object candidate 30 and the tracking target candidate 4C are consistent with each other, it is possible to judge that not the fallen object 3 but the tracking target 4 exists at that horizontal position.

In view of the above, in Step S50, the processor 51 determines whether or not the horizontal positions of the fallen object candidate 3C and the tracking target candidate 4C are consistent with each other. This determination processing is executed for each fallen object candidate 3C. When a difference in the horizontal position between the fallen object candidate 3C and the tracking target candidate 4C is equal to or smaller than a predetermined threshold, the processor 51 determines that the horizontal positions are consistent with each other (Step S50; Yes). In this case, the processing proceeds to Step S60. Otherwise (Step S50; No), the processing proceeds to Step S70.

1-3-6. Step S60 (Integration Processing)

Figure 9:
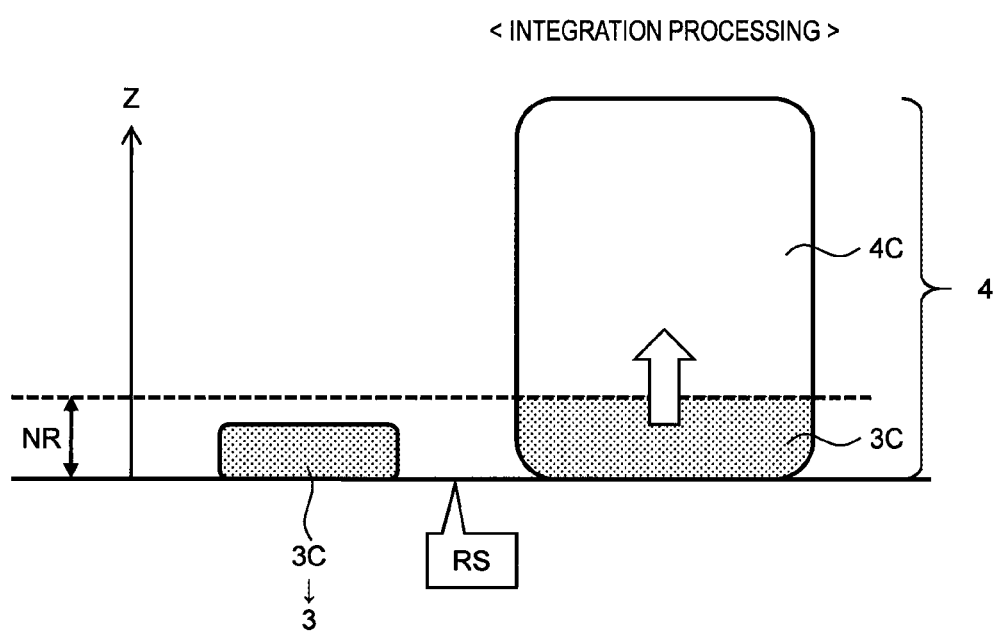
FIG. 9 is a conceptual diagram for explaining Step S60 of the object recognition processing according to the first embodiment of the present disclosure.

FIG. 9 is a conceptual diagram for explaining Step S60. In Step S60, the processor 51 executes integration processing. More specifically, the processor 51 integrates the fallen object candidate 3C and the tracking target candidate 4C whose horizontal positions are consistent with each other, to be the tracking target 4. In other words, the processor 51 recognizes the fallen object candidate 3C overlapping with the tracking target candidate 4C not as the fallen object 3 but as the tracking target 4.

1-3-7. Step S70

The processor 51 recognizes the fallen object candidate 3C remaining in the noise space NR as the fallen object 3. That is, the processor 51 recognizes the fallen object candidate 3C not integrated into the tracking target 4 as the fallen object 3. Moreover, the processor 51 recognizes the tracking target candidate 4C as the tracking target 4. The processor 51 generates the object recognition information 250 indicating the recognition result, and stores the object recognition information 250 in the memory device 52.

1-4. Effects

According to the present embodiment, as described above, the noise space NR near the road surface RS is set based on the terrain map information 230 indicating the absolute position of the road surface RS. The LIDAR point cloud PC indicated by the LIDAR measurement information 210 is classified into the first point cloud PC1 included in the noise space NR and the other second point cloud PC2. The fallen object candidate 3C included in the noise space NR is extracted from the first point cloud PC1. On the other hand, the tracking target candidate 4C not included in the noise space NR is extracted from the second point cloud PC2.

Accuracy of extraction of the tracking target candidate 4C not included in the noise space NR is higher than accuracy of extraction of the fallen object candidate 3C included in the noise space NR. When the horizontal positions of the fallen object candidate 3C and the tracking target candidate 4C are consistent with each other, it is possible to judge that not the fallen object 3 but the tracking target 4 exists at that horizontal position. In that case, the fallen object candidate 3C and the tracking target candidate 4C are integrated as the tracking target 4. In other words, the fallen object candidate 3C overlapping with the tracking target candidate 4C is recognized not as the fallen object 3 but as the tracking target 4. As a result, false recognition of the fallen object 3 is suppressed. That is, it is possible to increase accuracy of recognition of the fallen object 3.

2. Second Embodiment

In the above-described first extraction processing (Step S30), the separation processing is executed to separate the first point cloud PC1 into the road surface point cloud PCR and the fallen object point cloud PCF. However, detection information (e.g., the detected position) of the road surface point cloud PCR itself may include noises. Moreover, as mentioned above, the error in the pitch angle of the vehicle 1 causes a calculation error of the altitude of the road surface point cloud PCR. Therefore, it may not possible to eliminate the road surface point cloud PCR even by referring to the absolute position of the road surface RS indicated by the terrain map information 230.

In view of the above, a second embodiment provides a technique that executes the separation processing based on the LIDAR measurement information 210 without using the terrain map information 230. An overlapping description with the first embodiment will be omitted as appropriate.

2-1. Outline

Figure 10:
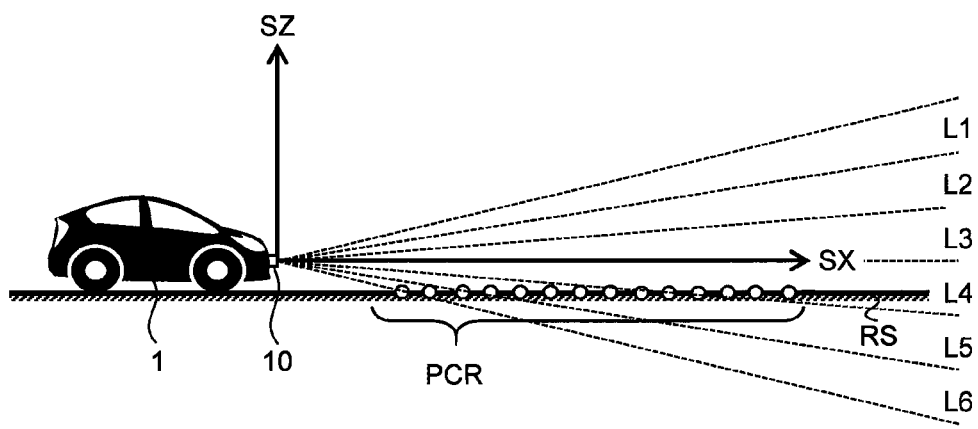
FIG. 10 is a conceptual diagram for explaining Step S30 of the object recognition processing according to a second embodiment of the present disclosure.

As shown in FIG. 10, the LIDAR 10 scans laser pulses not only in the horizontal direction but also in the vertical direction. A scan range in the vertical direction is represented by a plurality of layers L1 to Ln (here, n is an integer equal to or larger than 2). In the present embodiment, we focus on layers that detect the road surface point cloud PCR (i.e., the layers L4 to L6 in the example shown in FIG. 10).

Figure 11:
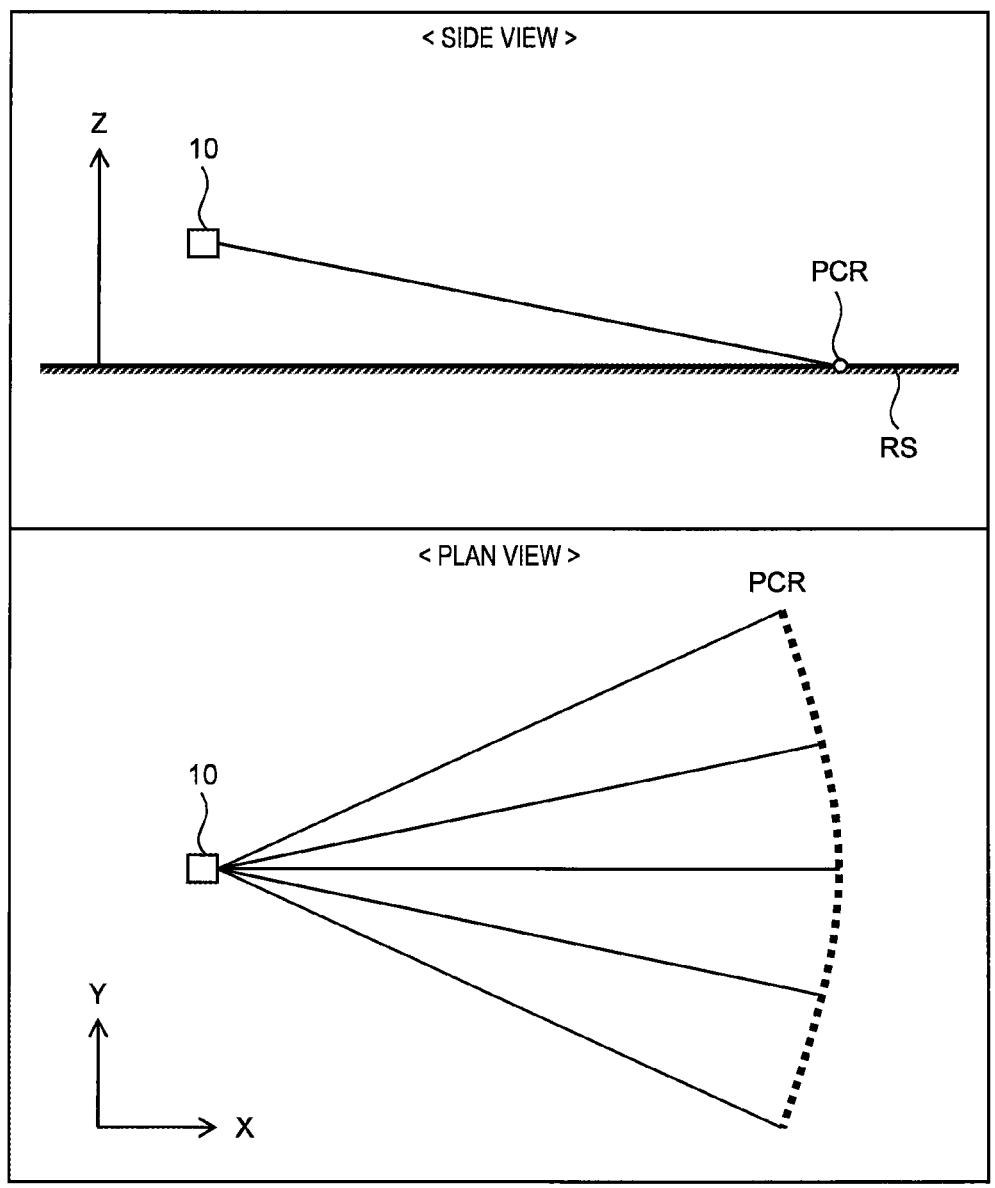
FIG. 11 is a conceptual diagram for explaining Step S30 of the object recognition processing according to the second embodiment of the present disclosure.

FIG. 11 conceptually shows a distribution of the road surface point cloud PCR belonging to a same layer. The Z-direction is the vertical direction, and an XY-plane is orthogonal to the Z-direction. Basically, the road surface point cloud PCR belonging to the same layer is distributed at a same distance from the LIDAR 10 in a radial fashion. However, the distance from the LIDAR 10 may be slightly different between the detected points due to detection noises and influence of irregularities of the road surface RS.

Figure 12:
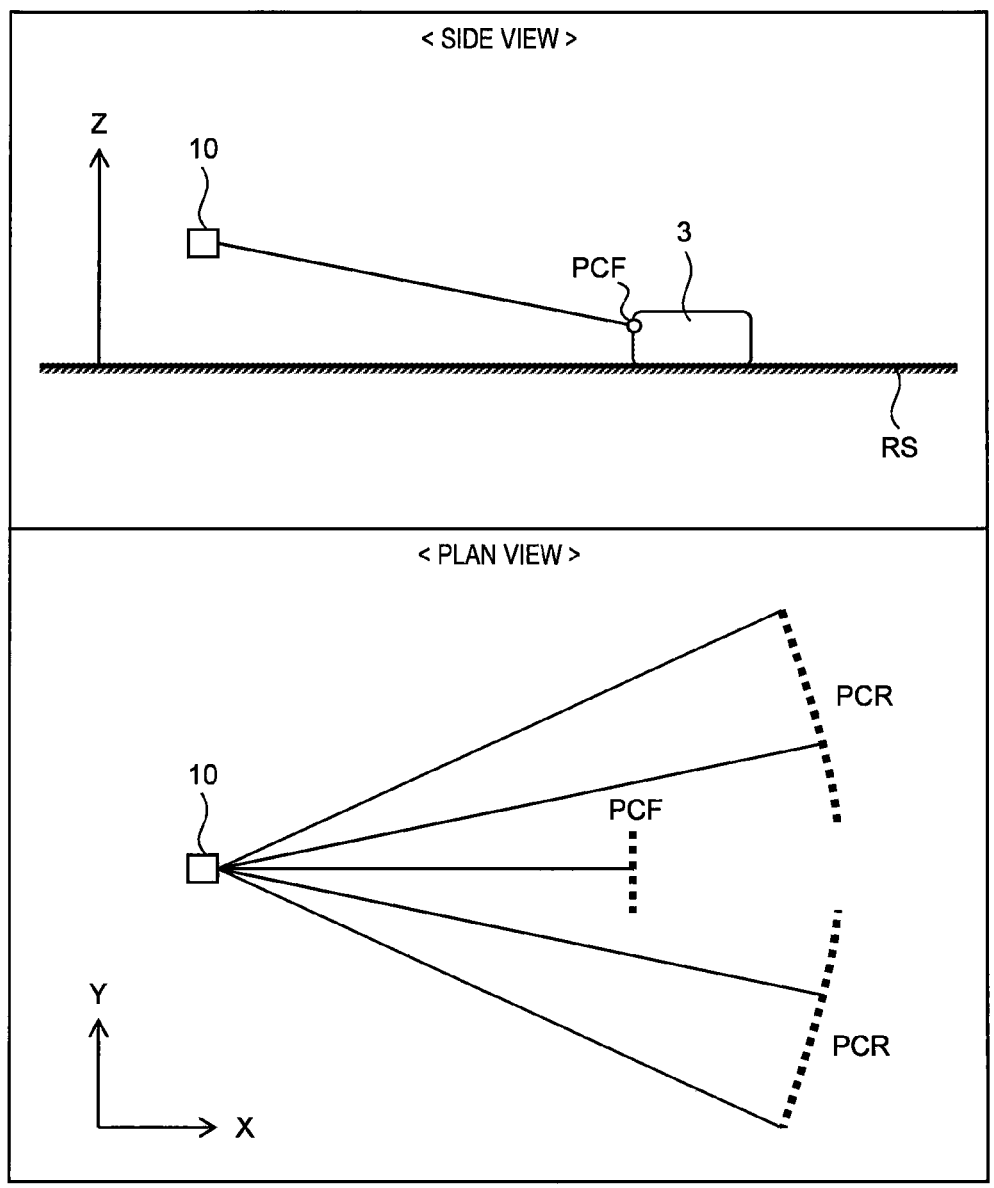
FIG. 12 is a conceptual diagram for explaining Step S30 of the object recognition processing according to the second embodiment of the present disclosure.

FIG. 12 shows a situation where a fallen object 3 exists on the road surface RS. A part of the laser pulses radiated from the LIDAR 10 is not reflected by the road surface RS but by a surface of the fallen object 3. The reflection points on the surface of the fallen object 3 constitute the above-described fallen object point cloud PCF. That is to say, the first point cloud PC1 includes both the road surface point cloud PCR and the fallen object point cloud PCF.

As shown in FIG. 12, as to the first point cloud PC1 belonging to the same layer, there is a clear difference (gap) between the detected position of the fallen object point cloud PCF and the detected position of the road surface point cloud PCR. For example, a distance from the LIDAR 10 to each detected point is different between the fallen object point cloud PCF and the road surface point cloud PCR. As another example, a difference in the detected position between adjacent two detected points increases conspicuously at a boundary between the fallen object point cloud PCF and the road surface point cloud PCR. Such the difference is distinctly different from mere detection noises and the irregularities of the road surface RS. In view of the above, according to the present embodiment, the separation processing is executed by focusing on such the difference.

2-2. Processing by Processor

Figure 13:
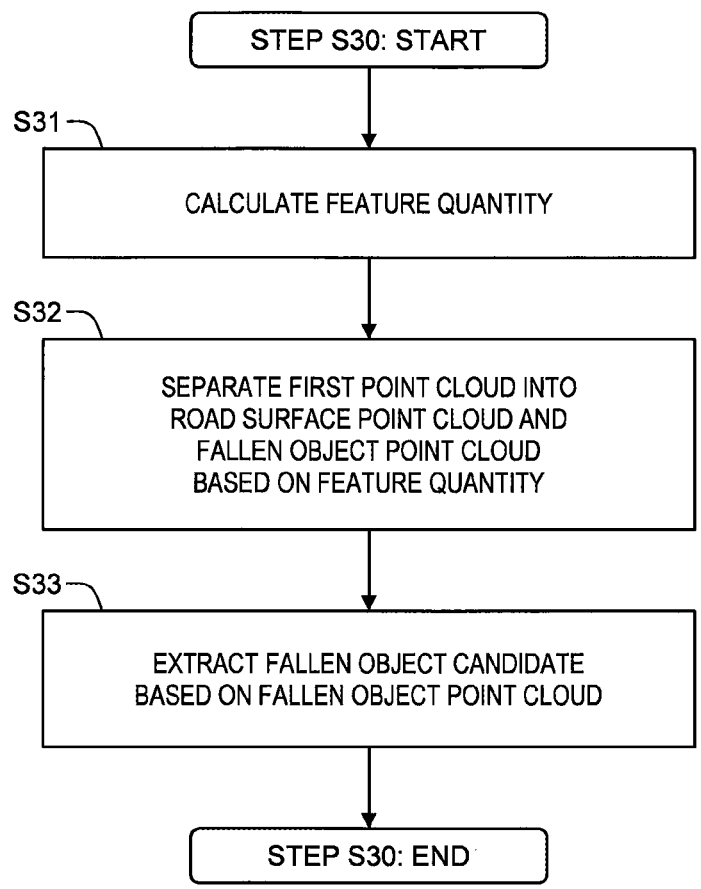
FIG. 13 is a flow chart showing Step S30 of the object recognition processing according to the second embodiment of the present disclosure.

FIG. 13 is a flow chart showing the first extraction processing (Step S30) according to the present embodiment.

2-2-1. Step S31

In Step S31, the processor 51 calculates a "feature quantity Q" of each detected point of the first point cloud PC1. The feature quantity Q is a parameter characterizing the difference described in FIG. 12. An example of the feature quantity Q is the distance from the LIDAR 10 to each detected point. Another example of the feature quantity Q is the difference in the detected position between adjacent detected points. The processor 51 can calculate the feature quantity Q of each detected point of the first point cloud PC1 based on the LIDAR measurement information 210 on the first point cloud PC1.

It should be noted that detection noises at adjacent two detected points correlate with each other. Therefore, calculating the difference in the detected position between adjacent two detected points makes it possible to reduce influence of the detection noises.

2-2-2. Step S32

In Step S32, the processor 51 separates the first point cloud PC1 into the road surface point cloud PCR and the fallen object point cloud PCF based on the feature quantity Q. A "separation criterion" used for separating the road surface point cloud PCR and the fallen object point cloud PCF is predetermined.

Figure 14:
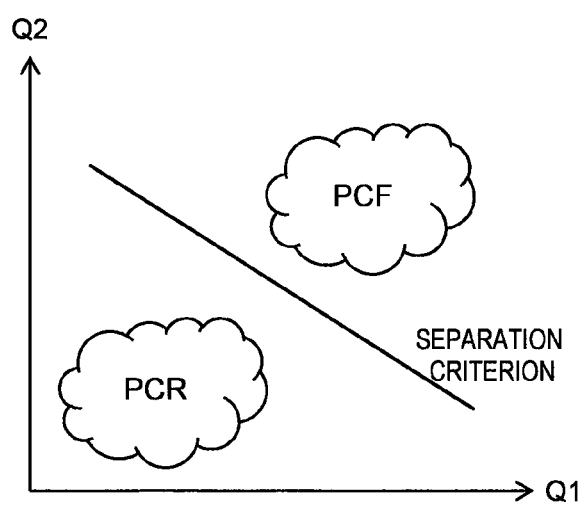
FIG. 14 is a conceptual diagram for explaining Step S30 of the object recognition processing according to the second embodiment of the present disclosure.

FIG. 14 is a conceptual diagram for explaining the separation criterion. In the example shown in FIG. 14, two kinds of feature quantities Q1 and Q2 are taken into consideration. In a feature space defined by the feature quantities Q1 and Q2, the road surface point cloud PCR and the fallen object point cloud PCF respectively have different distributions. The separation criterion is a criterion for separating (distinguishing) the road surface point cloud PCR and the fallen object point cloud PCF in the feature space. In the case of FIG. 14 where the feature space is defined by the two kinds of feature quantities Q1 and Q2, the separation criterion is given by a separation line. In a case of a feature space defined by one kind of feature quantity, the separation criterion is given by a separation value (i.e., a threshold). In a case of a feature space defined by three or more kinds of feature quantities, the separation criterion is given by a separation plane.

The separation criterion is determined in advance through an experiment or simulation. For example, the separation criterion can be determined in advance by comparing the LIDAR measurement information 210 between the situation where the fallen object 3 does not exist (see FIG. 11) and the situation where the fallen object 3 exists (see FIG. 12). Information indicating the separation criterion is stored in the memory device 52 in advance. The processor 51 separates the first point cloud PC1 into the road surface point cloud PCR and the fallen object point cloud PCF based on the feature quantity Q and the information on the separation criterion.

2-2-3. Step S33

In Step S33, the processor 51 extracts the fallen object candidate 3C based on the fallen object point cloud PCF. The well-known clustering process is used for extracting the fallen object candidate 3C. Here, it is allowable that a single fallen object 3 in reality is extracted as two or more fallen object candidates 3C. It is also allowable that two or more different fallen objects 3 in reality are extracted as a single fallen object candidate 3C.

2-3. Effects

Regarding the first point cloud PC1 belonging to the same layer, there is a clear difference (gap) between the detected position of the fallen object point cloud PCF and the detected position of the road surface point cloud PCR. Focusing on such the difference makes it possible to separate the road surface point cloud PCR and the fallen object point cloud PCF with high accuracy without being affected by noises of the information on the road surface point cloud PCR. Since accuracy of the Reparation processing is increased, accuracy of extraction of the fallen object candidate 3C is increased as well. As a result, the accuracy of recognition of the fallen object 3 also is further increased.

3. Third Embodiment

In a third embodiment, we describe a method of calculating a likelihood that the fallen object candidate 3C is the fallen object 3. The likelihood that the fallen object candidate 3C is the fallen object 3 is hereinafter referred to as a "fallen object likelihood LKF". An overlapping description with the foregoing embodiments will be omitted as appropriate.

Figure 15:
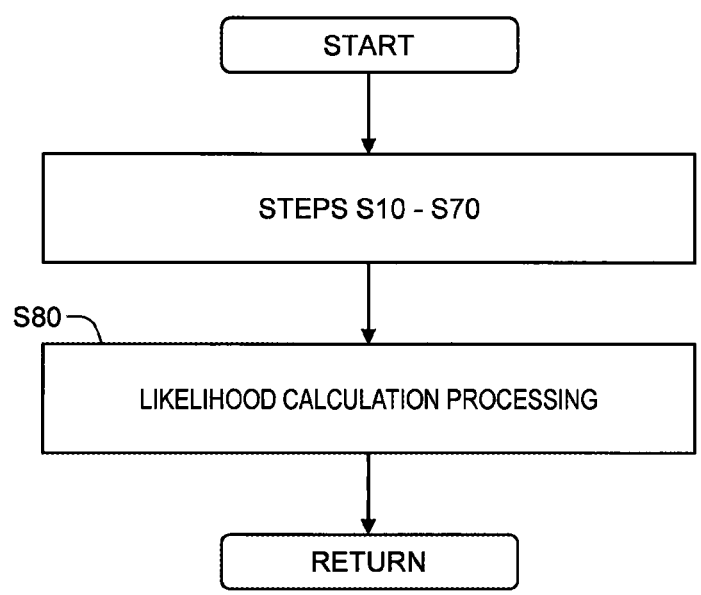
FIG. 15 is a flow chart showing the object recognition processing according to a third embodiment of the present disclosure.

FIG. 15 is a flow chart showing the object recognition processing according to the present embodiment. Steps S10 to S70 are the same as in the foregoing embodiments (see FIG. 5). The object recognition processing according to the present embodiment further includes Step S80. Step S80 is executed at least after the first extraction processing (Step S30).

In Step S80, the processor 51 executes likelihood calculation processing that calculates the fallen object likelihood LKF. The object recognition information 250 further includes information on the calculated fallen object likelihood LKF. Examples of a method of calculating the fallen object likelihood LKF are as follows.

3-1. First Example

It can be said that the fallen object likelihood LKF is higher as the feature quantity Q regarding the fallen object point cloud PCF corresponding to the fallen object candidate 3C is further away from the separation criterion (see FIG. 14). Therefore, the processor 51 calculates the fallen object likelihood LKF based on the separation criterion and the feature quantity Q regarding the fallen object point cloud PCF corresponding to the fallen object candidate 3C. More specifically, the processor 51 calculates a separation distance between the feature quantity Q and the separation criterion in the feature space, and then calculates the fallen object likelihood LKF according to the separation distance. The larger the separation distance is, the higher the fallen object likelihood LKF is.

3-2. Second Example

In a second example, a "continuity" regarding a same fallen object candidate 3C is considered. The continuity of a fallen object candidate 3C represents a degree to which a position of the fallen object candidate 3C is continuous over time.

Measurement by the LIDAR 10 and acquisition of the LIDAR measurement information 210 are performed every predetermined measurement cycle. Therefore, the position of the fallen object candidate 3C is updated every predetermined measurement cycle. Within the predetermined measurement cycle being a minute period, the absolute position of the fallen object 3 hardly changes, and thus it is expected that the position of the fallen object candidate 3C also hardly changes. In other words, it is expected that an amount of change in the position of the fallen object candidate 3C between a current value and a previous value is sufficiently small. The continuity increases as the amount of change decreases, and decreases as the amount of change increases.

Moreover, the laser pulses are not every time reflected from the fallen object 3. That is, there is a possibility that the same fallen object candidate 3C is extracted intermittently. Therefore, an average position of the fallen object candidate 3C over several cycles may he used for calculating the continuity.

Furthermore, the number of extractions of a fallen object candidate 3C per unit time may be reflected in the continuity regarding the fallen object candidate 3C. Tire continuity increases as the number of extractions per unit lime becomes larger. Conversely, the continuity decreases as the number of extractions per unit time becomes smaller.

When extracting a new fallen object candidate 3C, the processor 51 initializes the fallen object likelihood LKF regarding die fallen object candidate 3C. After that, the processor 51 repeatedly calculates the continuity regarding the fallen object candidate 3C based on an extraction history of the fallen object candidate 3C. When the continuity is equal to or higher than a continuity threshold, the processor 51 increases the fallen object likelihood LKF. On the other hand, when the continuity is lower than the continuity threshold, the processor 51 decreases the fallen object likelihood LKF. In this manner, the processor 51 updates the fallen object likelihood LKF regarding the fallen object candidate 3C based on the extraction history of the fallen object candidate 3C.

3-3. Third Example

A third example is a combination of the first example and the second example. First, the processor 51 calculates the fallen object likelihood LKF in accordance with the first example. Subsequently, the processor 51 calculates the continuity in accordance with the second example, and further increases or decreases the fallen object likelihood LKF according to the continuity.

3-4. Example of Updating of Fallen Object Likelihood

Figure 16:
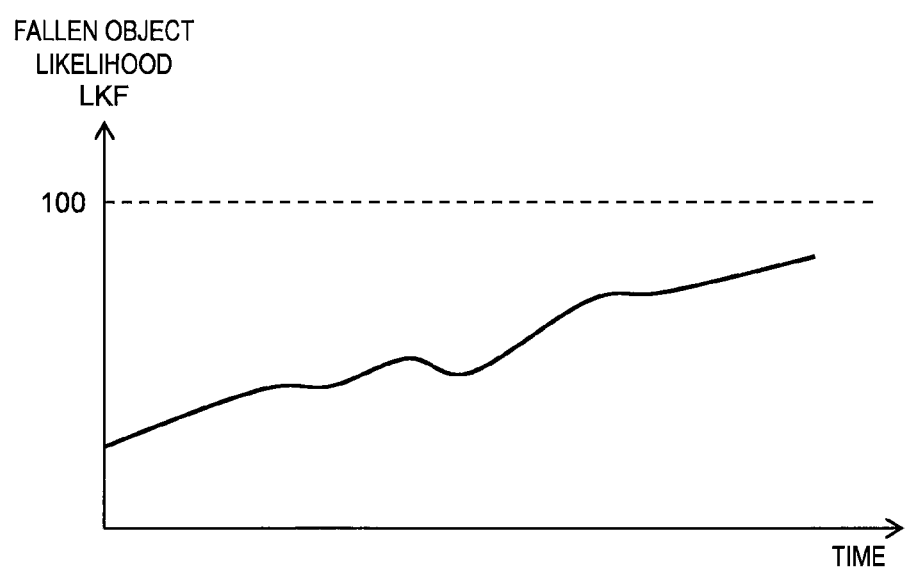
FIG. 16 is a timing chart showing an example of updating of a fallen object likelihood in the third embodiment of the present disclosure.

FIG. 16 is a timing chart showing an example of updating of the fallen object likelihood LKF. In an example shown in FIG. 16, the fallen object likelihood LKF gradually increases with time. Such the fallen object likelihood LKF can be used in vehicle travel control which will be described next.

It should be noted that in the likelihood calculation processing (Step S80), the processor 51 may further calculate a likelihood that the tracking target candidate 4C is the tracking target 4. A method of calculating the likelihood is similar to the above-described second example.

4. Fourth Embodiment

In a fourth embodiment, vehicle travel control based on a result of the object recognition processing is described. An overlapping description with the foregoing embodiments will be omitted as appropriate.

4-1. Configuration Example of Vehicle Control System

Figure 17:
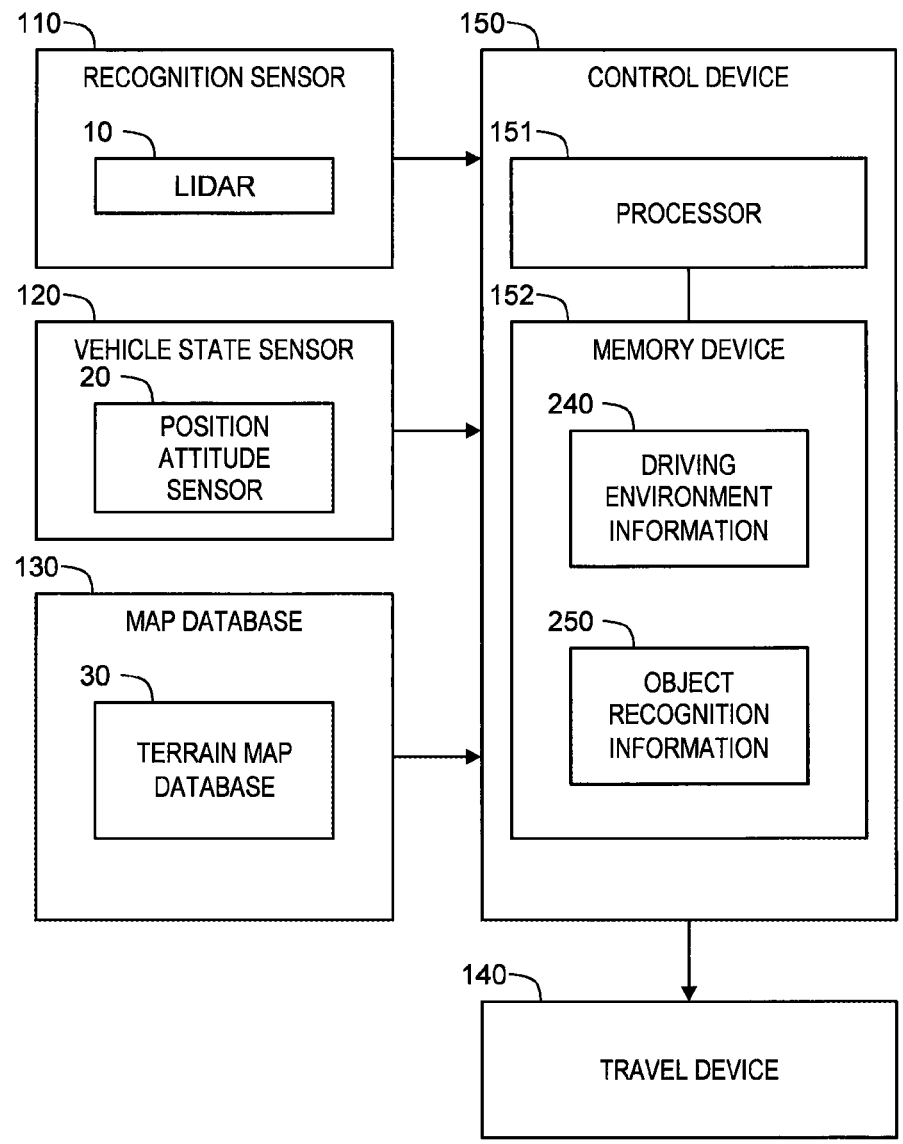
FIG. 17 is a block diagram showing a configuration example of a vehicle control system according to a fourth embodiment of the present disclosure.

FIG. 17 is a block diagram showing a configuration example of a vehicle control system 100 according to the present embodiment. The vehicle control system 100 includes a recognition sensor 110, a vehicle state sensor 120, a map database 130, a travel device 140, and a control device 150.

The recognition sensor 110 is installed on the vehicle 1 and recognizes (detects) a situation around the vehicle 1. The recognition sensor 110 includes the LIDAR 10 described above. The recognition sensor 110 may further include a camera and a radar.

The vehicle state sensor 120 is installed on the vehicle 1 and detects a state of the vehicle 1. The vehicle state sensor 120 includes the position attitude sensor 20 described above. The vehicle state sensor 120 may further include a vehicle speed sensor, an acceleration sensor, a yaw rate sensor, a steering angle sensor, and so forth.

The map database 130 is a collection of map information. The map database 130 includes a commonly-used road map information indicating a lane configuration and a road shape. Furthermore, the map database 130 includes the terrain map database 30 described above. The map database 130 may be stored in a predetermined memory device installed on the vehicle 1, or may be stored in a management server outside the vehicle 1.

The travel device 140 has functions of travel (acceleration, deceleration, and steering) of the vehicle 1. More specifically, the travel device 140 includes a driving device, a braking device, and a steering device. The driving device is a power source that generates a driving force. The driving device is exemplified by an engine, an electric motor, and an in-wheel motor. The braking device generates a braking force. The steering device turns (i.e. changes a direction of) a wheel of the vehicle 1. For example, the steering device includes a power steering (EPS: Electric Power Steering) device.

The control device 150 includes a processor 151 and a memory device 152. A variety of information is stored in the memory device 152. The processor 151 executes a variety of processing by executing a computer program. The computer program is stored in the memory device 152 or recorded on a computer-readable recording medium. Hereinafter, processing by the control device 150 will be described.

4-2. Processing by Control Device

Figure 18:
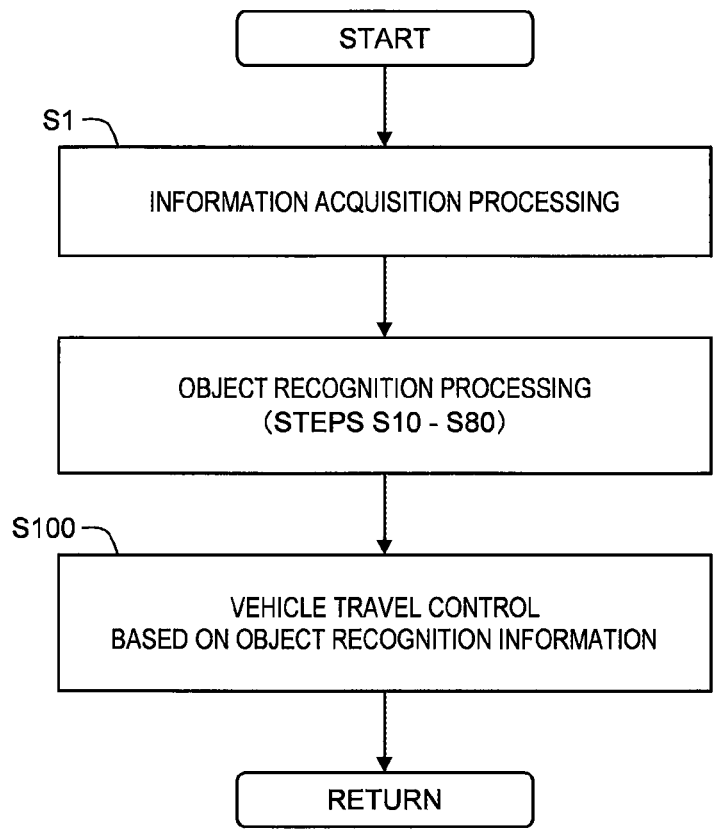
FIG. 18 is a flow chart showing processing by a control device of the vehicle control system according to the fourth embodiment of the present disclosure.

FIG. 18 is a flow chart showing processing by the control device 150 of the vehicle control system 100 according to the present embodiment.

4-2-1. Information Acquisition Processing (Step S1)

The control device 150 (i.e., the processor 151) acquires driving environment information 240 indicating a driving environment for the vehicle 1. The control device 150 stores the acquired driving environment information 240 in tire memory device 152.

The driving environment information 240 includes surrounding situation information, vehicle state information, and map information. The surrounding situation information is information indicating a result of recognition by the recognition sensor 110 and includes the LIDAR measurement information 210 described above. The control device 150 acquires the surrounding situation information from the recognition sensor 110. The vehicle state information is information indicating a result of detection by the vehicle state sensor 120 and includes the position attitude information 220 described above. The control device 150 acquires the vehicle state intonation from the vehicle state sensor 120. Furthermore, the control device 150 acquires necessary map information including the above-described terrain map information 230 from the map database 130. When the map database 130 is stored in the management server outside the vehicle 1, the control device 150 communicates with the management server to acquire necessary map intonation.

4-2-2. Object Recognition Processing (Steps S10 to S80)

Moreover, the control device 150 (i.e., the processor 151) executes the object recognition processing based on the driving environment information 240. The object recognition processing is that described in any of the foregoing embodiments. That is to say, the control device 150 serves as the "object recognition device 50" described in the foregoing embodiments. The control device 150 stores the object recognition information 250 indicating a result of the object recognition processing in the memory device 152.

4-2-3. Vehicle Travel Control (Step S100)

Furthermore, the control device 150 (i.e., the processor 151) executes vehicle travel control that controls travel of the vehicle 1. More specifically, the control device 150 executes the vehicle travel control by controlling an operation of the travel device 140. The vehicle travel control includes driving control, braking control, and steering control. The driving control is executed by controlling the driving device. The braking control is executed by controlling the braking device. The steering control is executed by controlling the steering device. The control device 150 functions also as a "vehicle travel control device" that executes the vehicle travel control.

In particular, the control device 150 executes the vehicle travel control based on the object recognition information 250. More specifically, the control device 150 generates a travel plan based on the recognized object (i.e., the fallen object 3, the tracking target 4). The travel plan includes a target trajectory. The control device 150 executes the vehicle travel control such that the vehicle 1 travels in accordance with the travel plan.

For example, the control device 150 determines, based on the driving environment information 240 and the object recognition information 250, whether or not there is a possibility that the vehicle 1 collides with an obstacle (e.g., the fallen object 3) on a vehicle path. When the vehicle 1 is likely to collide with the obstacle, the control device 150 generates a travel plan (steering, deceleration, and the like) for avoiding collision with the obstacle. Then, the control device 150 executes collision avoidance control in accordance with the travel plan.

When the fallen object likelihood LKF described in the third embodiment is obtained, the control device 150 may generate a travel plan against the fallen object 3 according to the fallen object likelihood LKF.

For example, if the collision avoidance control is activated when the fallen object likelihood LKF is still low, a driver feels a sense of strangeness when the recognition of the fallen object 3 is false recognition. Such erroneous activation of the collision avoidance control leads to decrease in confidence in the collision avoidance control. In view of the above, the control device 150 switches a content of the travel plan in stages according to the fallen object likelihood LKF.

As an example, a first threshold and a second threshold higher than the first threshold are considered. When the fallen object likelihood LKF is equal to or higher than the first threshold and lower than the second threshold, the control device 150 generates a travel plan that turns off acceleration. It is thus possible to buy time until the vehicle 1 reaches the fallen object 3. After that, as the vehicle 1 comes closer to the fallen object 3, the fallen object likelihood LKF is updated and becomes more accurate. When the fallen object likelihood LKF becomes equal to or higher than the second threshold, the control device 150 generates another travel plan that performs the collision avoidance control (i.e., at least one of deceleration and steering) in order to avoid the fallen object 3. As a result, the erroneous activation of the collision avoidance control is suppressed.

4-3. Effects

According to the present embodiment, as described above, the vehicle travel control is executed based on the result of the object recognition processing. For example, the collision avoidance control with respect to the fallen object 3 is executed based on the result of recognition of the fallen object 3. In particular, using the fallen object likelihood LKF makes it possible to suppress the erroneous activation of the collision avoidance control. This contributes to reduction of the sense of strangeness and increase in confidence in the collision avoidance control.

The vehicle travel control according to the present embodiment can be applied to automated driving control.

What is claimed is:

1. An object recognition device that recognizes an object around a vehicle,
   the vehicle comprising a LIDAR (Laser Imaging Detection and Ranging),
   a LIDAR point cloud being a set of detected points detected by the LIDAR,
   the object recognition device comprising:
      a memory device in which LIDAR measurement information indicating a detected position of each of the detected points, position attitude information indicating an absolute position and an attitude of the vehicle, and terrain map information indicating an absolute position of a road surface are stored; and
      a processor configured to execute object recognition processing that recognizes the object around the vehicle, wherein
   the object includes a fallen object on the road surface and a tracking target other than the fallen object, and
   in the object recognition processing, the processor:
      sets a space having a first height from the absolute position of the road surface as a noise space, based on the terrain map information;
      classifies the LIDAR point cloud into a first point cloud included in the noise space and a second point cloud not included in the noise space, based on the LIDAR measurement information and the position attitude information;
      executes first extraction processing that extracts a fallen object candidate being a candidate for the fallen object, based on the first point cloud;
      executes second extraction processing that extracts a tracking target candidate being a candidate for the tracking target, based on the second point cloud;
      determines whether or not horizontal positions of the fallen object candidate and the tracking target candidate are consistent with each other;
      integrates the fallen object candidate and the tracking target candidate whose horizontal positions are consistent with each other, to be the tracking target; and
      recognizes the fallen object candidate not integrated into the tracking target as the fallen object, wherein:
   a road surface point cloud is the LIDAR point cloud representing the road surface,
   the first point cloud includes the road surface point cloud and a fallen object point cloud other than the road surface point cloud,
   in the first extraction processing, the processor:
      executes separation processing that separates the first point cloud into the road surface point cloud and the fallen object point cloud, based on the LIDAR measurement information or the terrain map information; and
      extracts the fallen object candidate based on the fallen object point cloud
   regarding the first point cloud belonging to a same layer, there is a difference between the detected position of the fallen object point cloud and the detected position of the road surface point cloud,
   a feature quantity is a parameter characterizing the difference,
   in the separation processing, the processor:
      calculates the feature quantity of each of the detected points of the first point cloud, based on the LIDAR measurement information on the first point cloud; and separates the first point cloud into the road surface point cloud and the fallen object point cloud, based on the feature quantity a fallen object likelihood is likelihood that the fallen object candidate is the fallen object, the processor further executes likelihood calculation processing that calculates the fallen object likelihood after extracting the fallen object candidate, a separation criterion for separating the road surface point cloud and the fallen object point cloud is predetermined, in the likelihood calculation processing, the processor calculates the fallen object likelihood based on the separation criterion and the feature quantity regarding the fallen object point cloud corresponding to the fallen object candidate, and the fallen object likelihood becomes higher as the feature quantity regarding the fallen object point cloud corresponding to the fallen object candidate is further away from the separation criterion.

2. The object recognition device according to claim 1, wherein
the first height is predetermined based on an error in a pitch angle of the vehicle.

3. The object recognition device according to claim 1, wherein
the feature quantity includes a distance from the LIDAR to each of the detected points.

4. The object recognition device according to claim 1, wherein
the feature quantity includes a difference in the detected position between adjacent detected points.

5. The object recognition device according to claim 1, wherein
a continuity represents a degree to which a position of the fallen object candidate is continuous over time, and
in the likelihood calculation processing, the processor:
calculates the continuity based on an extraction history of the fallen object candidate;
increases the fallen object likelihood, when the continuity is equal to or higher than a continuity threshold; and
decreases the fallen object likelihood, when the continuity is lower than the continuity threshold.

6. A vehicle control system comprising:
an object recognition device configured to execute object recognition processing that recognizes an object around a vehicle; and
a vehicle travel control device configured to execute vehicle travel control that controls travel of the vehicle based on a result of the object recognition processing, wherein
the vehicle includes a LIDAR (Laser Imaging Detection and Ranging),
a LIDAR point cloud is a set of detected points detected by the LIDAR,
the object recognition device includes:
a memory device in which LIDAR measurement information indicating a detected position of each of the detected points, position attitude information indicating an absolute position and an attitude of the vehicle, and terrain map information indicating an absolute position of a road surface are stored; and
a processor configured to execute the object recognition processing,
the object includes a fallen object on the road surface and a tracking target other than the fallen object, and in the object recognition processing, the processor:
sets a space having a first height from the absolute position of the road surface as a noise space, based on the terrain map information;
classifies the LIDAR point cloud into a first point cloud included in the noise space and a second point cloud not included in the noise space, based on the LIDAR measurement information and the position attitude information;
executes first extraction processing that extracts a fallen object candidate being a candidate for the fallen object, based on the first point cloud;
executes second extraction processing that extracts a tracking target candidate being a candidate for the tracking target, based on the second point cloud;
determines whether or not horizontal positions of the fallen object candidate and the tracking target candidate are consistent with each other;
integrates the fallen object candidate and the tracking target candidate whose horizontal positions are consistent with each other, to be the tracking target; and
recognizes the fallen object candidate not integrated into the tracking target as the fallen object, wherein:
a road surface point cloud is the LIDAR point cloud representing the road surface,
the first point cloud includes the road surface point cloud and a fallen object point cloud other than the road surface point cloud,
in the first extraction processing, the processor:
executes separation processing that separates the first point cloud into the road surface point cloud and the fallen object point cloud, based on the LIDAR measurement information or the terrain map information; and
extracts the fallen object candidate based on the fallen object point cloud
regarding the first point cloud belonging to a same layer, there is a difference between the detected position of the fallen object point cloud and the detected position of the road surface point cloud,
a feature quantity is a parameter characterizing the difference,
in the separation processing, the processor:
calculates the feature quantity of each of the detected points of the first point cloud, based on the LIDAR measurement information on the first point cloud; and
separates the first point cloud into the road surface point cloud and the fallen object point cloud, based on the feature quantity a fallen object likelihood is likelihood that the fallen object candidate is the fallen object,
the processor further executes likelihood calculation processing that calculates the fallen object likelihood after extracting the fallen object candidate,
a separation criterion for separating the road surface point cloud and the fallen object point cloud is predetermined,
in the likelihood calculation processing, the processor calculates the fallen object likelihood based on the separation criterion and the feature quantity regarding the fallen object point cloud corresponding to the fallen object candidate, and
the fallen object likelihood becomes higher as the feature quantity regarding the fallen object point cloud corresponding to the fallen object candidate is further away from the separation criterion.

7. The vehicle control system according to claim 6, wherein
the vehicle travel control device generates a travel plan against the fallen object according to the fallen object likelihood, and executes the vehicle travel control in accordance with the travel plan.

8. The vehicle control system according to claim 7, wherein
a second threshold is higher than a first threshold,
when the fallen object likelihood is equal to or higher than the first threshold and lower than the second threshold, the travel plan includes turning off acceleration, and
when the fallen object likelihood is equal to or higher than the second threshold, the travel plan includes performing at least one of deceleration and steering in order to avoid the fallen object.

9. An object recognition device that recognizes an object around a vehicle,
the vehicle comprising a LIDAR (Laser Imaging Detection and Ranging),
a LIDAR point cloud being a set of detected points detected by the LIDAR,
the object recognition device comprising:
 a memory device in which LIDAR measurement information indicating a detected position of each of the detected points, position attitude information indicating an absolute position and an attitude of the vehicle, and terrain map information indicating an absolute position of a road surface are stored; and
 a processor configured to execute object recognition processing that recognizes the object around the vehicle, wherein
the object includes a fallen object on the road surface and a tracking target other than the fallen object, and
in the object recognition processing, the processor:
 sets a space having a first height from the absolute position of the road surface as a noise space, based on the terrain map information;
 classifies the LIDAR point cloud into a first point cloud included in the noise space and a second point cloud not included in the noise space, based on the LIDAR measurement information and the position attitude information;
 executes first extraction processing that extracts a fallen object candidate being a candidate for the fallen object, based on the first point cloud;
 executes second extraction processing that extracts a tracking target candidate being a candidate for the tracking target, based on the second point cloud;
 determines whether or not horizontal positions of the fallen object candidate and the tracking target candidate are consistent with each other;
 integrates the fallen object candidate and the tracking target candidate whose horizontal positions are consistent with each other, to be the tracking target; and
 recognizes the fallen object candidate not integrated into the tracking target as the fallen object, wherein:
a road surface point cloud is the LIDAR point cloud representing the road surface,
the first point cloud includes the road surface point cloud and a fallen object point cloud other than the road surface point cloud,
in the first extraction processing, the processor:
 executes separation processing that separates the first point cloud into the road surface point cloud and the fallen object point cloud, based on the LIDAR measurement information or the terrain map information; and
 extracts the fallen object candidate based on the fallen object point cloud
regarding the first point cloud belonging to a same layer, there is a difference between the detected position of the fallen object point cloud and the detected position of the road surface point cloud,
a feature quantity is a parameter characterizing the difference,
in the separation processing, the processor:
 calculates the feature quantity of each of the detected points of the first point cloud, based on the LIDAR measurement information on the first point cloud; and
 separates the first point cloud into the road surface point cloud and the fallen object point cloud, based on the feature quantity
a fallen object likelihood is likelihood that the fallen object candidate is the fallen object,
the processor further executes likelihood calculation processing that calculates the fallen object likelihood after extracting the fallen object candidate,
a continuity represents a degree to which a position of the fallen object candidate is continuous over time, and
in the likelihood calculation processing, the processor:
 calculates the continuity based on an extraction history of the fallen object candidate;
 increases the fallen object likelihood, when the continuity is equal to or higher than a continuity threshold; and
 decreases the fallen object likelihood, when the continuity is lower than the continuity threshold.

* * * * *